United States Patent [19]

Breck et al.

[11] 4,360,836
[45] Nov. 23, 1982

[54] APPARATUS FOR REMOVING X-RAYS AND OTHER HARMFUL RADIATION FROM VISIBLE RADIATION

[75] Inventors: Judy A. Breck, 330 E. 85 St., New York, N.Y. 10028; Thomas W. Evans, New York, N.Y.

[73] Assignee: Judy A. Breck, New York, N.Y.

[21] Appl. No.: 126,576

[22] Filed: Mar. 3, 1980

[51] Int. Cl.$^3$ ............................................. G21K 3/00
[52] U.S. Cl. .................................. 358/245; 350/299; 378/158
[58] Field of Search ............... 350/1.1, 1.6, 1.7, 290, 350/299, 301; 358/245, 247, 253; 250/508, 510, 520

[56] References Cited
U.S. PATENT DOCUMENTS 1,489,934  4/1924  Eklund ........................... 350/301
2,165,078  7/1939  Toulon ........................... 350/418
3,688,121  8/1972  Ott ................................. 250/520

Primary Examiner—F. L. Evans
Assistant Examiner—Bruce Y. Arnold

[57] ABSTRACT

The present invention provides an apparatus which removes harmful radiation from the visible image producing radiation emitted by a cathode ray tube. The apparatus comprises an image conveying member for conveying by reflectance the visible image originating from a cathode ray tube and an image receiving member for receiving the image conveyed by the image conveying member. The image conveying member is comprised of a reflective layer and an absorptive layer. The reflective layer of the image conveying member is substantially reflective of visible electromagnetic radiation and substantially transmissive of electromagnetic radiation of wavelengths shorter than visible radiation. The absorptive layer of the image conveying member is comprised of a material capable of absorbing the electromagnetic radiation transmitted by the reflective layer of the image conveying member. The image receiving member is comprised of a material which is substantially transmissive of electromagnetic radiation of wavelengths shorter than visible radiation.

36 Claims, 10 Drawing Figures

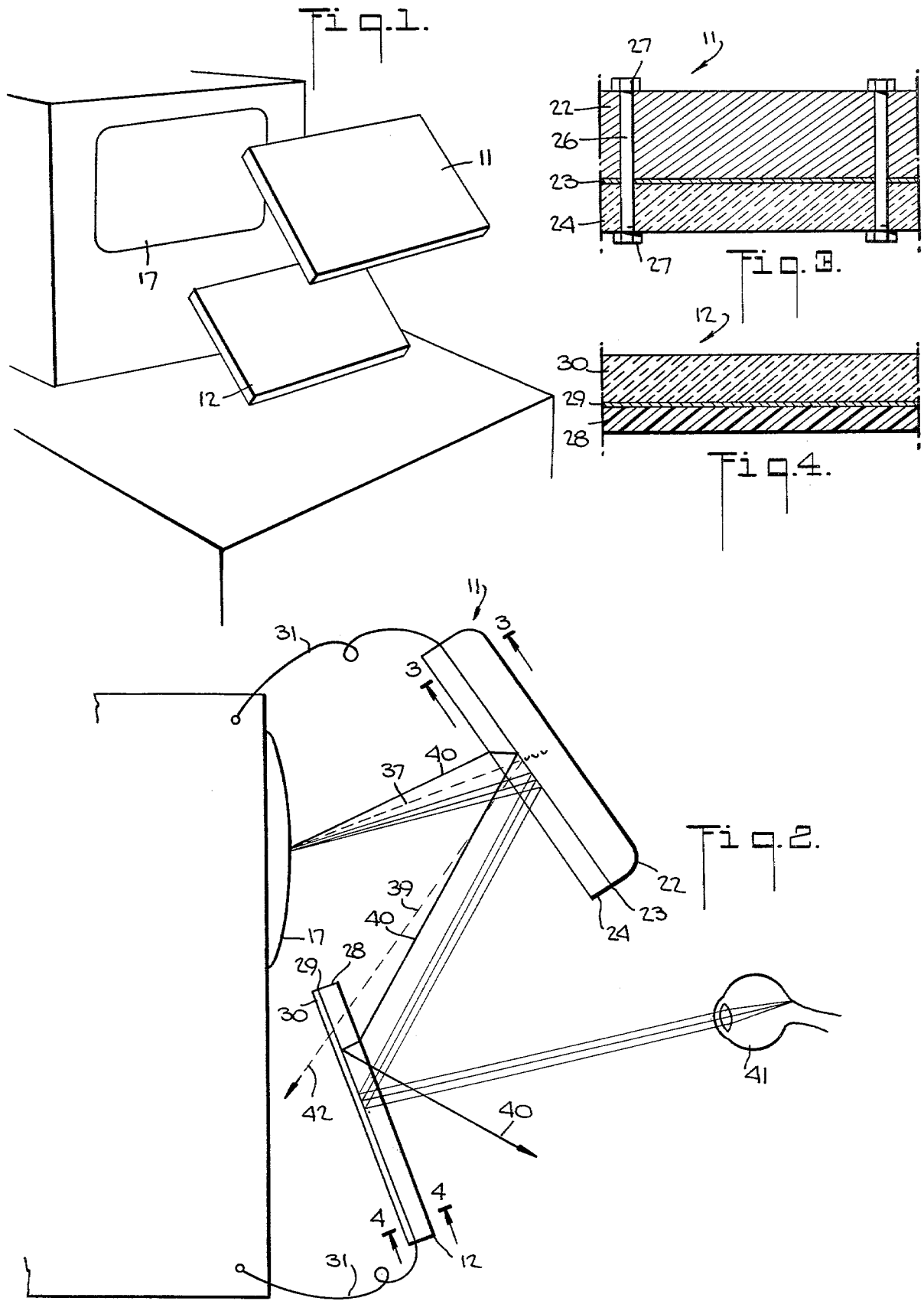

U.S. Patent  Nov. 23, 1982  Sheet 2 of 3  4,360,836
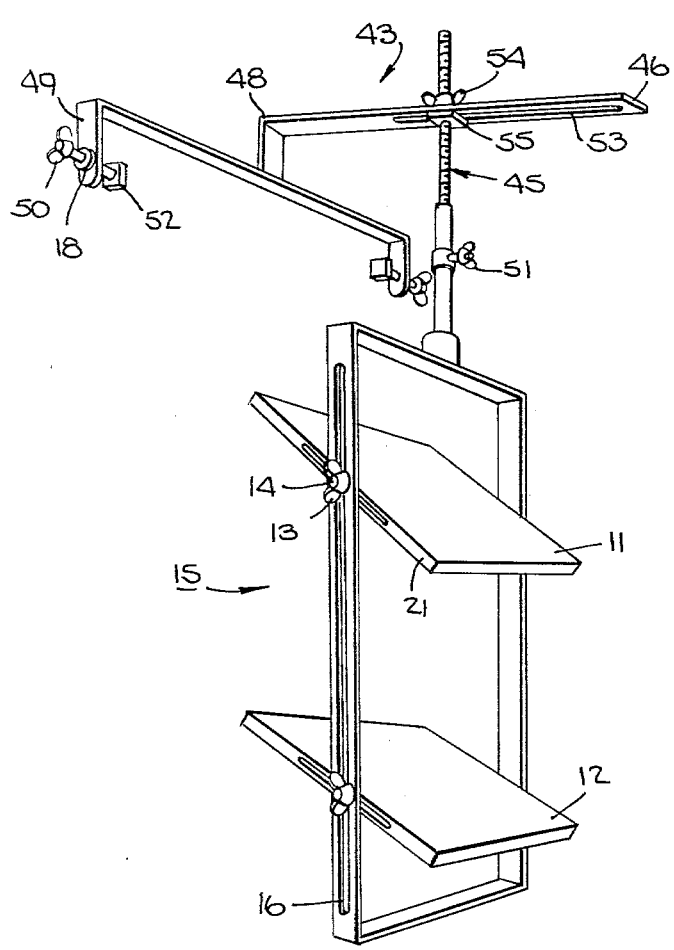
Fig.5.
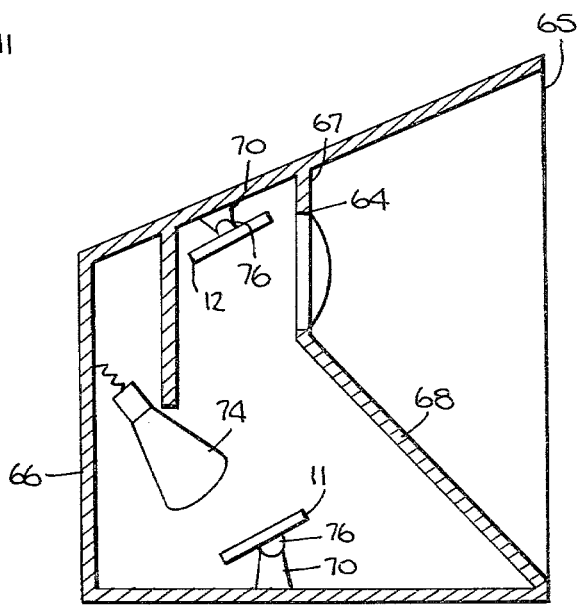
Fig.10.
Fig.8.
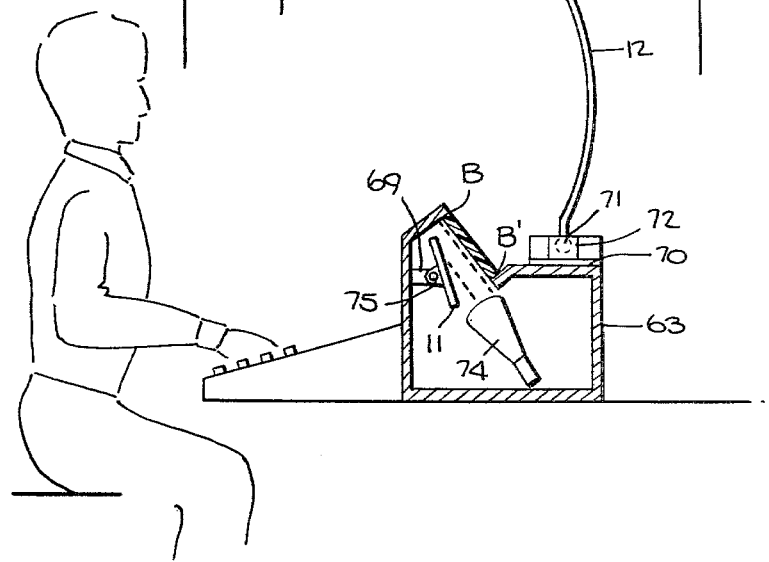
Fig.9.

APPARATUS FOR REMOVING X-RAYS AND OTHER HARMFUL RADIATION FROM VISIBLE RADIATION

FIELD OF THE INVENTION

This invention relates to an apparatus for removing harmful radiation from the visible image-producing radiation transmitted by a cathode ray tube.

BACKGROUND OF THE INVENTION

It has recently been discovered and publicized that cathode ray tubes such as those widely employed in conventional television sets, instrument panels and currently proliferating in computer terminals emit low levels of harmful radiation. See J. N. Ott, *Health and Light,* Chapter 12, pg. 119 (1973). The non-visible radiation emitted by a cathode ray tube may include gamma radiation, x-ray radiation, ultraviolet, infrared radiation, radio waves, television waves and other microwaves. Human exposure to such radiation is undesirable and may result in deleterious biological effects.

In view of the above, it is the object of the present invention to provide an apparatus for removing harmful radiant emissions from the visible image producing radiation emitted by a cathode ray tube or other electronically activated television-like screen so that the visual image originating from such a source may be safely viewed.

In the past a variety of methods and devices have been used to selectively absorb or reflet both visible and non-visible radiation projected from electronically activated television-like screens. One of the earlier methods used to accomplish the above was the placement of a wavelength selective filter between the viewer and the screen. These filters transmitted only radiation of certain wavelengths while absorbing or reflecting all others. For example, U.S. Pat. No. 2,470,666 discloses a light shielding enclosure for the screen-end of a cathode ray tube used for displaying various wave configurations. Although this patent discloses the basic concept of selectively filtering radiation of different wavelengths, it does so only within the context of selecting one visible light ray from another visible light ray, i.e., blue from amber. The principle of selection is that of passing radiant energy through a filter; the radiation received by the viewer is still beamed directly at the viewer, as is the case with the following two patents.

U.S. Pat. No. 2,690,554, like the '666 patent discussed above, discloses a transparent filter for use with a cathode ray tube. The disclosed filter is adapted to selectively filter out ultraviolet radiation using a silica-soda-potash-lime glass containing therein small quantities of cerium which renders the glass absorbent to practically all radiation having a wavelength below 360 angstroms.

U.S. Pat. No. 2,655,452 discloses a glass composition adapted for use in the construction of the screen end of a cathode ray tube and more particularly a television picture tube. The disclosed glass is capable of absorbing harmful x-ray and ultraviolet rays resulting from the bombardment of the fluorescent coating on the inside face of the screen by an electron beam. In this patent, the glass acts as the filter.

U.S. Pat. No. 3,473,944 discloses a radiation-reflective sheet consisting of a glass panel coated on opposite sides with films comprising varying amounts of antimony oxide and tin. The panel is adapted to reflect heat as well as substantial amounts of radiation throughout the visible spectrum while at the same time permitting objects viewed therethrough to be seen without distortion of color.

U.S. Pat. No. 3,645,600 discloses a heat absorbing reflector comprising a metallic substrate having positioned thereon an anti-reflection coating and multilayer interference coating. This device is adapted to reflect generally all wavelengths of radiation within the visible spectrum while absorbing substantially all wavelengths of heat radiation (i.e., electromagnetic radiation in the wavelength range beyond 0.7 microns).

Unlike the wavelength selective filters discussed above, the apparatus of the present invention selectively removes harmful radiation from the image producing radiation transmitted by a cathode ray tube or other electronically activated television-like screen, by selectively reflecting visible radiation to the eye of the observer, while selectively absorbing the non-visible radiation emitted by the cathode ray tube or other electronic image originating source, and by selectively altering the path travelled by the non-visible radiation transmitted by the image originating source such that it is directed out of the line of sight of the observer.

The prior art also discloses various devices employing two reflective surfaces wherein the first reflective surface receives the reflected image from a cathode ray tube and reflects the image to the second reflective surface from which the observer views the image. See U.S. Pat. Nos. 2,438,256, 3,291,906, 2,165,078, and 2,234,227. However, unlike the apparatus of the present invention, the devices disclosed by the abovelisted patents do not employ means for selectively removing harmful radiation from the visible radiation originating from the cathode ray tube.

BRIEF DESCRIPTION OF THE INVENTION

The present invention provides an apparatus which removes harmful non-visible radiation fom the visible image producing radiation emitted by a cathode ray tube comprising:

a. image conveying means for conveying by reflectance the visible image originating from a cathode ray tube, said image conveying means being comprised of a reflective layer and an absorptive layer, said reflective layer being substantially reflective of visible electromagnetic radiation and substantially transmissive of electromagnetic radiation of wavelengths shorter than visible radiation and said absorptive layer being comprised of a material capable of absorbing the electromagnetic radiation transmitted by said reflective layer; and b. image receiving means for receiving the visible image conveyed by said image conveying means, said image receiving means being substantially reflective of visible electromagnetic radiation and substantially transmissive of electromagnetic radiation of wavelengths shorter than visible radiation.

The present invention also provides a method for removing harmful non-visible radiation from the visible image producing radiation emitted by a cathode ray tube comprising the steps of:

a. reflecting the visible and non-visible radiation emitted by a cathode ray tube onto a first surface which is substantially reflective of visible radiation and substantially transmissive of non-visible radiation having wavelengths shorter than visible radiation, b. absorbing said non-visible radiation transmitted by said first surface, and reflecting said visible radiation and any non-visible radiation not transmitted by said first surface to a second surface, c. said second surface being substantially reflective of visible radiation and substantially transmissive of radiation of wavelengths shorter than visible radiation.

DESCRIPTION OF THE FIGURES

This invention will be described in detail with references to the figures wherein:

FIG. 1 is a perspective view of the image conveying member and image receiving member positioned in front of the cathode ray tube of a conventional television set;

FIG. 2 is a cross-sectional view of the embodiment of FIG. 1, illustrating the reflection and absorption of visible and non-visible electromagnetic radiation during operation of the invention;

FIG. 3 is a cross-sectional view of the image conveying member taken along line 3—3 of FIG. 2;

FIG. 4 is a cross-sectional view of the image receiving member taken along line 4—4 of FIG. 2;

FIG. 5 shows a perspective view of an embodiment of the apparatus which includes a goose neck member adapted for mounting the apparatus to the console of a computer housing a cathode ray tube;

FIG. 8 is a cross-sectional view of a computer terminal which employs a miniaturized cathode ray tube, and incorporates the image conveying and image receiving member of the present invention;

FIG. 9 is a cross-sectional view of a television console which employs the image conveying and image receiving members of the present invention in combination with a projector; and FIG. 10 is a cross-sectional view of an embodiment of the invention which employs a single image conveying member.

DETAILED DESCRIPTION OF THE INVENTION

Figure 6:
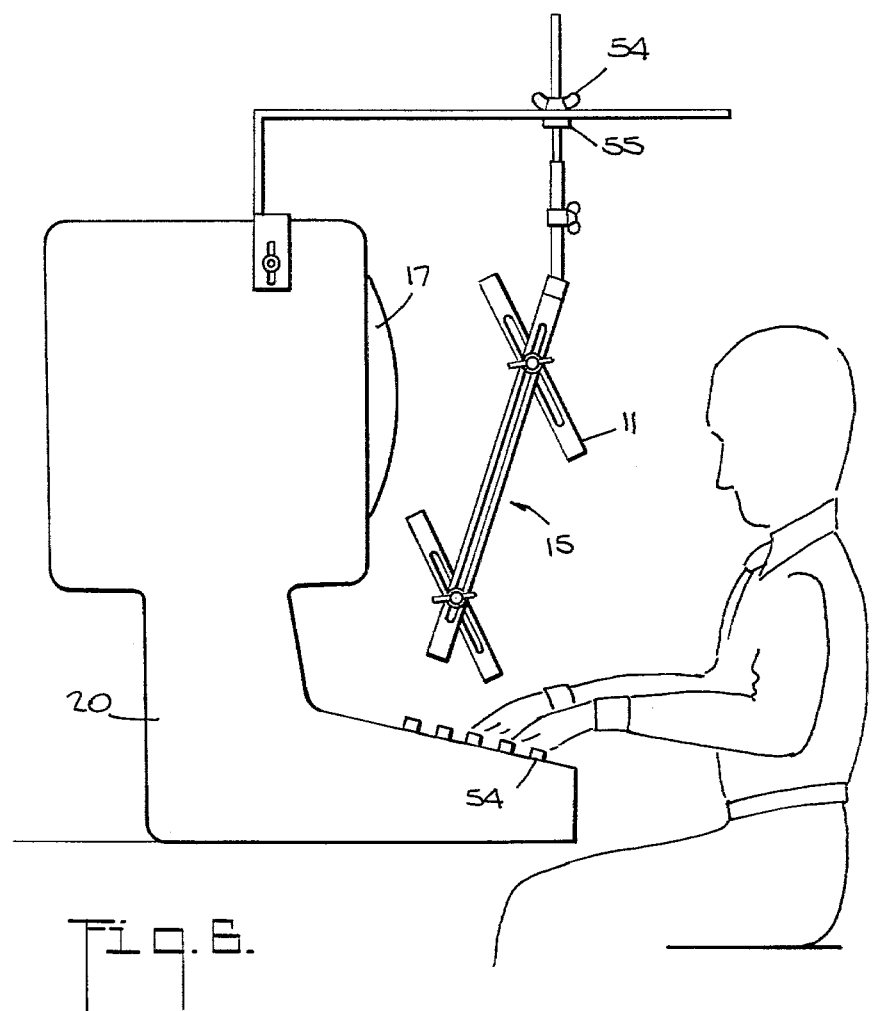
FIG. 6 is a perspective view of the embodiment of FIG. 5 mounted on a conventional cathode ray tube text screen computer terminal.

The present invention is comprised of an image conveying member (11) and an image receiving member (12). The image conveying member (11) conveys the visual image from a cathode ray tube (17) to the image receiving member (12). The visual image ultimately viewed by an observer from the image receiving member (12) is free of harmful electromagnetic radiation.

FIG. 1 shows the image conveying member (11) and image receiving member (12) positioned in front of the cathode ray tube of a conventional television console.

The image conveying member (11) includes a first absorptive layer (22), an intermediate reflective surface (23), and an outer refractive layer (24).

The absorptive layer (22) of the image conveying member (11) serves as a radiation barrier. It may be formed from any material capable of absorbing the electromagnetic radiation emitted by the cathode ray tube (17) which penetrates the refractive layer (24) and reflective layer (23), of the image conveying member. The radiation most likely to penetrate layer (23) and (24) will be radiation having wavelengths shorter than visible radiation - namely, gamma ray, x-ray and, possibly, some frequencies of ultraviolet radiation. This absorption of the biologically dangerous wavelengths shorter than the visible spectrum duplicates the natural event of sunlight which human eyes were evolved to sense: when sunlight strikes the earth, the gamma and x-radiation which may have penetrated the earth's atmosphere are absorbed into the struck surface, while visible frequencies are reflected and used by biological eyes for "seeing".

Preferably, the absorptive layer is comprised of lead of about 1/16 inch thickness which will absorb all x-ray and gamma ray radiation which strikes it. Alternatively, the absorptive layer may be comprised of other dense radiation absorptive materials. Such absorptive materials include metals such as copper, steel, or their alloys, or dense aggregate materials such as concrete, leaded glass, leaded plastics or the like. The material selected for the absorptive layer should be capable of absorbing the strongest random dose of penetrating radiation which might be emitted by the particular cathode ray tube (17) in use. For example, if the tube is capable of emitting alpha or beta particles, the absorptive layer should be capable of absorbing them.

In addition to the protection of the viewer's eyes (in particular, the lenses and retina) by the removal of harmful radiation such as gamma, x-ray and, possibly, ultraviolet and microwave radiation from the visual radiation emitted by the cathode ray tube (17), the absorptive layer (22) functions to protect the other parts of the body of the observer when the apparatus is positioned between the observer and the screen of the cathode ray tube (17).

The reflective layer (23) of the image conveying member (11) is positioned between the absorptive layer (22) and refractive layer (24). The reflective layer (23) is formed of a material which is reflective of visible electromagnetic radiation and transmissive of wavelengths shorter than visible radiation. The transmissive nature of the reflective layer refers to the ability of the reflective layer (23) to allow electromagnetic radiation of wavelengths shorter than visible radiation to pass through it. Preferably, the reflective layer is virtually entirely transmissive of any gamma or x-rays emitted by the cathode ray tube (17). A reflective layer of a metal such as silver is preferred since its reflectance of visible radiation is high, while it is transmissive of gamma and x-ray radiation, and primarily transmissive of ultra-violet radiation. The reflectance properties of silver, as well as common metals such as gold, aluminum, copper and steel are disclosed by F. A. Jenkins and H. E. White, *Fundamentals of Optics*, Chapter 25, McGraw-Hill (1976).

The reflectance of metals varies considerably with wavelength. Silver and aluminum are of particular utility, however, because they are known to maintain a high percent reflectance throughout the visible electromagnetic spectrum. Silver is the preferred material for use as the reflective layer (23) since silver exhibits a very high reflectance of visible radiation of wavelengths above about 3200 A. Thus, silver will transmit to the absorptive layer (22) almost all of the radiation which impinges upon it having a wavelength shorter than radiation in the visible region.

Aluminum or alloys of aluminum, such as aluminum and magnesium alloys, are also highly reflective in the visible region. However, aluminum is more reflective of ultraviolet radiation than silver and, hence, a reflective layer formed from aluminum would be likely to reflect more ultraviolet radiation to the image receiving member (12), than would a reflective layer formed from silver. Moreover, aluminum has a grayish hue which may detract from the sharpness of the image. The reflective layer may also be formed from gold, copper or steel which, although reflective in the visible region, are less reflective of visible frequencies than either aluminum or silver. Metal alloys such as chrome or other materials which are reflective of visible radiation and transmit x-ray and gamma radiation may also be employed.

When an electrically conductive material such as silver or another metal is used as the reflective layer (23), this layer may be grounded. The ground serves to remove through electrical grounding electromagnetic radiation, particularly wavelengths longer than the visible spectrum, which might otherwise be reflected along with visible frequencies by the reflective layer (23).

The reflective layer (23) may also comprise a grid pattern capable of selectively transmitting electromagnetic frequencies. The grid pattern may comprise a reflective surface which in addition to being comprised of a substance such as silver which is transmissive of frequencies shorter than visible radiation would be comprised of a pattern of lines (derived from diffraction grating principles and/or similar methods of spectroscopy) which transmit radiation of wavelengths longer than visible radiation, but reflects visible radiation. The grid pattern may comprise closely spaced slits on a flat surface, or alternate reflecting and non-reflecting grooves on a flat or curved surface. A grid may be formed by engraving a diffraction pattern into a layer of aluminum coated onto glass.

As an alternative to the metallic materials discussed above, the reflective layer may be formed from non-metallic reflective materials such as glass, plastics, polished rock, ceramics or other materials which reflect visible radiation.

The percent reflectance of visible radiation and the concomitant transmission of radiation of wavelengths shorter than visible radiation, may also be affected by the thickness of the reflective layer. Thus, the thickness of the reflective layer should be minimized so as to provide a clear reflection of the transmitted image, while maintaining minimum thickness and, hence, a maximum percent transmission of radiation having wavelengths shorter than visible radiation. Thus, the reflective layer may comprise a layer of silver vaporized in a conventional manner onto the surface of the refractive layer (24) which, as discussed below, preferably comprises a transparent sheet of glass or plastic.

The refractive layer (24) may be comprised of one or more layers of a transparent material which refracts electromagnetic radiation. For example, the refractive layer (24) may be comprised of one or more layers of transparent glass or plastic. Preferably the thickness of this layer is about 1/16 of an inch. Because glass will absorb much of the ultraviolet radiation which impinges upon it, a glass refractive layer will serve to remove much of the ultraviolet radiation from the visible radiation emitted from the cathode ray tube. As mentioned above, the refractive layer (24) may carry a coating of silver which comprises the reflective layer (23) of the image conveying member (11).

The refractive layer (24) and reflective layer (23) are secured to the absorptive layer (22). The layers may be clamped together by forming an aperture in the image conveying member (11), and fastening the layers together with a threaded nut (26) and bolts (27).

The image receiving member (12) shown in cross-section by FIG. 4 includes a refractive layer (28) and an inner reflective layer (29). The refractive layer (28) and reflective layer (29) may correspond in design to the refractive layer (24) and reflective layer (23) of the image conveying member (11). Preferably, however, the reflective layer (29) of the image receiving member is formed from silver, and the refractive layer (28) is formed from glass.

In alternative embodiments of the image conveying member (11) and image receiving member (12), the reflective layers may be eliminated. Thus, the visual image is conveyed and received by the reflective surfaces of the refractive layers of the members (11) and (12). In such embodiments, the refractive layers are preferably formed from glass.

Optionally, the image receiving member (12) may include a backing layer (30) which serves to protect the reflective layer (29) during handling. This layer may be comprised of glass, wood, paint, plastic, or rubber. The layers (28), (29) and (30) may be secured together in the manner described above with reference to layers (22), (23) and (24) of the image conveying member (11). In some applications this backing layer may be comprised of absorptive materials as described with regard to the image conveying member and in such applications the image receiving member would absorb any stray radiation of frequencies shorter than visible radiation rather than allowing them to pass through the image receiving member.

The image conveying member (11) and/or the image receiving member (12) may be grounded by, for example, securing a metallic silver or copper ground wire (31) in contact with the metallic reflective layers of the members (11), (12). In this manner, wavelengths longer than the visible ones (including various frequencies known as "microwaves") which may reach the reflective layer will be removed by the ground.

FIG. 2 illustrates the absorption and reflectance of light of visible and non-visible wavelengths by the image conveying member (11), and the image receiving member (12). The image conveyed through the apparatus may be an image originating from the image displaying screen of a cathode ray tube (17), or a light emitting surface such as an instrument dial, the illuminated digits of a calculating device or any other image displaying means which in addition to the displaying of a visual image, also emits or may emit radiation of wavelengths in the non-visible regions of the electromagnetic spectrum.

More specifically, (17) may be a cathode ray tube which emits radiation in the visual portion of the electromagnetic spectrum: that is, radiation having a wavelength of from about $10^3$–$10^4$ Angstroms, as well as radiation of shorter wavelengths such as ultraviolet radiation of 180–3900 Å, x-rays of 0.06–2 Å, as well as gamma radiation. The cathode ray tube may also emit electromagnetic radiation of wavelengths longer than visible radiation, such as microwaves, radio waves, television rays, etc.

With reference to FIG. 2, radiation of various wavelengths is emitted by the cathode ray tube (17). Upon passing through the refractive layer (24) of the image conveying member (11), radiation of all wavelengths is refracted. Radiation having wavelengths shorter than visible radiation, i.e., the x-ray and gamma radiation emitted by the cathode ray tube (17) penetrates the refractive layer (24) and reflective layer (23), and is absorbed by the absorptive layer (22). The passage of such radiation through the member (11) and its ultimate absorption by the absorptive layer (22) is shown by the dotted line (37) of FIG. 2. Virtually all of the harmful x-ray and gamma radiation will pass through the reflective and refractive layers and will be absorbed. When the refractive layer (24) of the image conveying member (11) is formed from glass, much of the ultraviolet radiation will be absorbed by the refractive layer. Some of the frequencies, closest to visual of the ultraviolet radiation which are not absorbed by the refractive layer, may be reflected by the member (11) toward the image receiving member (12). However, the shorter, more biologically dangerous ultraviolet frequencies will be transmitted to the absorptive layer (22). Moreover, some radiation having wavelengths longer than visible radiation such as microwave, radio and TV radiation may also pass through the refractive layer and reflective layer and be absorbed. However, because metals such as silver are reflective of radiation above the visible region, most radiation having wavelengths longer than visible radiation will be reflected along with the visible radiation toward the image receiving member (12).

The radiation shown by line (40), reflected by the image conveying member (11), may include ultraviolet radiation having wavelengths close to the visible region, as well as radiation of wavelengths longer than visible radiation such as infrared radiation, microwave radiation, radio waves, and the like. The radiation of non-visible wavelengths, reflected from the image conveying member (11) will be reflected from this member at angles different from the angles at which the visible radiation is reflected. That is, due to the passage of the radiation through the refractive layer (24) and refractive layer (28), the path of radiation in the visible range is no longer parallel to the paths of the potentially harmful non-visible radiation emitted by the cathode ray tube (17).

The parallel lines (38) represent the path of visible radiation through the apparatus. Line (40) represents the deviance by refraction of the paths of any non-visible radiation which is conveyed through the apparatus. The non-visible radiation represented by line (40) may consist of ultraviolet radiation—especially the ultraviolet radiation of wavelengths closest to the visible region—as well as non-visible radiation such as microwaves, radiowaves, etc. As shown by the parallel lines (38), the viewer, when positioning the image conveying member (11), locates the path of visual image and reflects it onto the image receiving member (12). The observer views the visual image which originated at the cathode ray tube (17) from the image receiving member (12). Since the non-visible radiation has been refracted by both the refractive layer (24) of the image conveying member (11) and the refractive layer (28) of the receiving member (12), the paths of the non-visible radiation through the apparatus will not be parallel to the path of the visible radiation and, hence, any non-visible radiation (40) reflected from the image receiving member (12) will be reflected out of the line of sight of the viewer (41). Thus, the observer by positioning the visual image conveyed from the member (11) onto the member (12), and by aligning the visual image provided by the member (12) with his line of sight, will locate the path of non-visible radiation out of his line of sight. Although it is unlikely, if any gamma or x-ray radiation should reach the image receiving member, it will penetrate it and pass away from the viewer, as shown by lines (30) and (42) of FIG. 2.

Preferably, the refractive layer (28) and reflective layer (29) of the image receiving member (12) are comprised of materials which will transmit the maximum number of non-visible wavelengths, so that any stray radiation reaching the image receiving member (12) will pass through it. Thus, preferably, the image receiving member (12) is comprised of a glass plate coated with a thin reflective layer of silver.

As an alternative to the embodiments discussed above, either the refractive layer (24) of the image conveying member (11) or the refractive layer (28) of the image receiving member (12) may be omitted. Moreover, in alternative embodiments, both the refractive layer (24) and the refractive layer (28) may be omitted. However, to provide the most complete protection from the possibility that stray non-visible radiation will reach the eyes of the viewer, refractive layers are preferably employed on both the image conveying member and the image receiving member. It should also be noted that the image receiving member (12) may include a radiation absorptive layer corresponding to the absorptive layer (22) of the image conveying member (11). The use of an absorptive layer on the image receiving member prevents any radiation which may penetrate the image receiving member from radiating into the environment.

The apparatus causes the radiation emitted by the cathode ray tube (17) to travel an extended distance before reaching the viewer. The increased distance traveled by the radiation emitted by the cathode ray tube (17) before viewing further enhances the safety of the visual image.

The image conveying member (11) conveys a mirror image of the original visual image provided by the cathode ray tube (17). The visual image conveyed by the image conveying member (11) is corrected by the image receiving member (12). Thus, the image viewed by the observer from the member (12) corresponds to the visual image which originated at the cathode ray tube (17). During the process of conveying the visual image some visible radiation may be eliminated. However, the image received and viewed from the image receiving member (12) is sufficiently intense to provide a clear visual image. The viewer's eyes are now also more at home perceptually and environmentally, focusing on light twice reflected as opposed to dots of radiation emitted from focused on, bombarded phosphorous, which dots may be far more intense and irritating than perception and visual accommodation convey, i.e., living tissue is not protected by pain from radiation: diagnostic x-rays do not hurt, nor does a sunburn while it is taking place.

Both the increase in distance and the lessening of the amount of visible radiation reaching the eyes contribute to the comfort and safety of text editors in particular who spend many hours reading from cathode ray tube surfaces at a distance of a few inches. Similar benefit is inherent in the system in the fact that all reflected light is polarized to some degree. Thus, the visual image ultimately viewed by the observer from the image receiving member (12) will be comprised of polarized visible light. The degree of polarization will affect the intensity of the image reflected from the image receiving member (12). By increasing the angle of incidence of the visible light emitted by the cathode ray tube (17) onto the image conveying member (11), and/or the angle of incidence of the visible light conveyed by the image conveying member (11) onto the image receiving member (12), the degree of polarization of the reflected light is increased. By increasing the degree of polarization the observer may adjust the intensity of the image conveyed by the member (12).

In order to adjust the intensity, reduce glare and/or otherwise refine the radiation conveying the image, the image conveying member (11) and/or the image receiving member (12) may include an optical attachment such as a conventional polarizing lens. Polarization can be incorporated within the apparatus in other ways; for example, a polarizer in the form of a sheet may be secured to the image displaying surface of the cathode ray tube (17) with an analyzer located at either the image conveying or image receiving member. The conveyance of the viewed image from the surface of the cathode ray tube onto the image receiving member will create other significant opportunities for refining the viewed image by alterations and attachments at the receiving member and other locations in the apparatus. For example, the image can be magnified to the most comfortable size for viewing or reading.

FIG. 5 shows an embodiment of the invention which includes a mount (43) for securing a housing (15) to the console (20) of a conventional computer terminal, which encases a cathode ray tube (17).

The housing (15) includes a single channel (16) within which the relative positions of the members (11) and (12) are fully adjustable. The housing (15) may be manufactured from plastic, wood, aluminum or the like.

The image conveying member (11) and image receiving member (12) include pin mounts (14), which are received by the housing channel (16). The pin mounts (14) are threaded pins and are secured to the sidewalls (21) of the members (11) and (12). The pin mounts (14) may be secured to the members (11) and (12) by, for example, forming an aperture in the sidewall (21) of the members (11) and (12) and securing the pin (14) within the aperture with glue or epoxy.

The vertical distance separating the image conveying member (11) and the image receiving member (12) within the channel (16) is adjusted by loosening the butterfly nuts (13) which engage the pin mount (14), and raising or lowering the members (11) and (12) within the channel (16). The members (11) and (12) are secured in the desired position within the channel (16) by tightening the butterfly nuts (13) against the sidewalls of the housing (15).

The angular disposition of the image conveying member (11) relative to the cathode ray tube (17) of the computer terminal (20) is fully adjustable. Such an adjustment is made simply by loosening the butterfly nuts (13) and rotating the member (11 or 12) about the pin mount (14) axis. Moreover, the position of the image conveying member (11) relative to the lower image receiving member (12) is also fully adjustable. As was discussed above with reference to FIG. 2, the position of the image conveying member (11) is adjusted to receive the image displayed by the cathode ray tube (17). The image receiving member (12) is adjusted relative to the image conveying member (11), so that the visual image from the image conveying member (11) is conveyed onto the reflective surface of the image receiving member (12). The observer views a visual image which originated from the cathode ray tube (17), from the image receiving member (12).

As an alternative to the particular housing (15) shown by the embodiment of FIG. 1, various other housings for the members (11) and (12) may be employed. Preferable housings permit the adjustment of:

(1) the distance between the image receiving member (12) and the image conveying member (11).

(2) the vertical height of the two members within the housing, (3) the angular disposition of the image conveying member relative to the screen of the cathode ray tube, (4) the angular disposition of the image receiving member (12) relative to image conveying member (11), and (5) the distance between the image conveying member (11) and the cathode ray tube (17).

Thus, as an alternative to the housing (15), the members (11) and (12) may be mounted in a housing having a vertical series of apertures along its sidewalls which receive pegs, screws or the like, which pass through the housing apertures, and into corresponding apertures in the sidewalls (21) of the members (11) and (12). The housing may also be comprised of a series of disengageable or collapsible members such that the housing, when not in use, or during transport, may be disassembled or collapsed.

The housing shown by FIG. 5 is secured to a mount (43) adapted to secure the housing to a console (20) encasing a cathode ray tube. However, the housing (15) absent the member (43) may be employed as a freestanding and portable housing for the apparatus. For example, the housing (15) may be employed to mount the apparatus in a suitable position in front of the cathode ray tube of a conventional television console. When employed in this manner, the housing (15) may be modified to include a handle for ease of transport.

The length of the channel (16) and overall height of the housing are preferably adjusted such that the image conveying member (11) and image receiving member (12) may be folded into the housing sidewalls to provide an essentially planar structure. That is, for ease of transport, the members (11) and (12) are rotated inwardly of the housing until the sidewalls (21) of the members (11) and (12) are parallel to the sidewalls of the housing (15).

The housing (15) may be secured to a terminal which encases a cathode ray tube by means of the mount (43). The mount (43) includes a vertical support member (45) and a lateral support member (46). The vertical support member (45) is an extensible pole which may be extended or contracted to a desired length, and secured in a fixed position by a hand-fastenable member (51). The lateral support member (46) includes a T-shaped member (48) which has sidewalls (49). Hand-fastenable pin member (50) is threaded to an internally threaded aperture (18) in the sidewalls (49). A pad member (52) is secured to the pin member (50). In use, the apparatus is secured to the terminal by hand-turning the threaded pin (50) which causes the pin to extend inwardly of the sidewall (49) until the pad member (52) engages a sidewall of the console (20). Preferably, the apparatus housing (15) and the mount (43) are formed from a light weight material such as aluminum, plastic or a light wood. The pad member (52) is preferably formed from rubber or felt so that the sidewall of the console (20) is not damaged when the mount (43) is secured to it.

The lateral support member (46) includes a channel (53) which enables the user to adjust the distance between the cathode ray tube (17) and the housing (15). The housing (15) is secured to the desired position relative to the console (20), by hand-tightening the nut (54) which engages screw threads on the vertical support member (45), and secures the member (46) against the plate (55) of the vertical support member (45).

FIG. 6 shows the housing (15) encasing the image receiving member (12) and image conveying member (11), suspended in front of a cathode ray tube (17). The console (20) represents a conventional design for a cathode ray tube text screen, such as that employed by word processing computers, as well as other computers and other kinds of equipment which employ cathode ray tubes for the visual reproduction of data. In use, the observer may adjust the position of the housing (15) by adjusting the length of the extensible support member (45) until the image conveying member (11) generally opposes the cathode ray tube (17), and the image receiving member (12) is in a position comfortable for viewing. The distance separating the housing (15) and the console (20) may also be adjusted by adjusting the position of the extensible support member (45) within the channel (53) as described above. In this manner the housing (15) and image receiving member (12) may be placed in a position which is comfortable for viewing, and which does not interfere with the observer's access to the keyboard (54) of the console (20). The image viewed by the observer from the image receiving member (12) is conveyed free of the harmful radiation to which the observer would be subjected if the cathode ray tube (17) were viewed directly. In addition, the observer's eyes are focused away from the screen, and a barrier of material which shields dangerous gamma and x-ray emissions is positioned between the screen and the observer's head. Although the embodiment of FIG. 6 is shown with reference to a computer terminal, the mount (43) may be attached to any console which houses a cathode ray tube or other electronically activated television-like screen.

Figure 7:
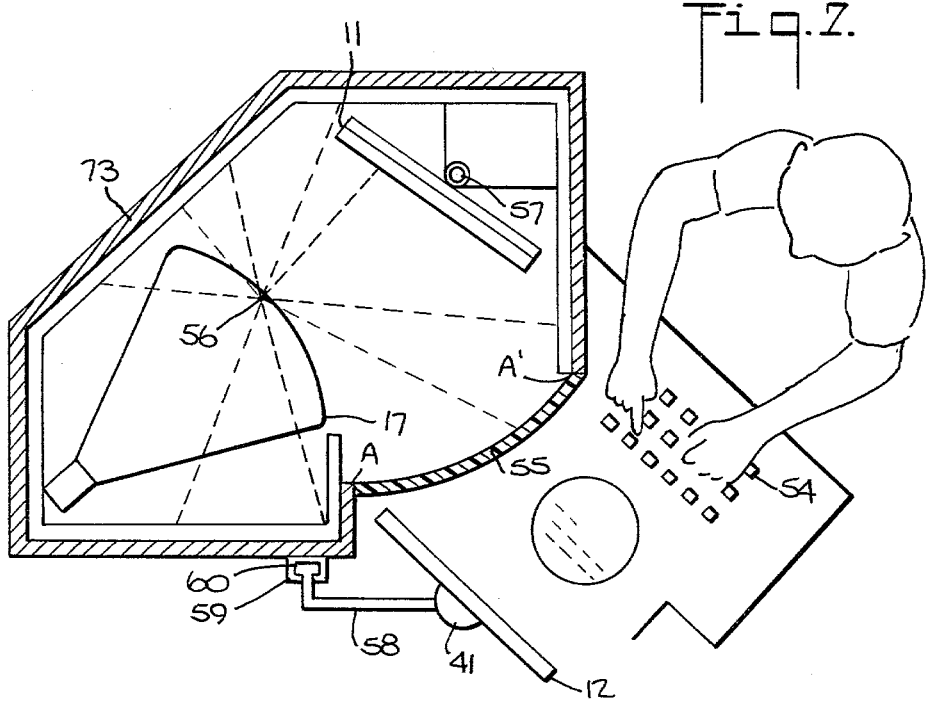
FIG. 7 is a top-plan view in partial cross-section of a housing for a cathode ray tube which incorporates the present invention.

FIG. 7 shows a console of a cathode ray tube screen terminal adapted to incorporate the image conveying member (11) and the image receiving member (12) of the present invention. In the embodiment shown, the cathode ray tube (17) is not directed at the operator's eyes. Thus, the observer seated to work the keyboard (54) does not read the image directly from the cathode ray tube. Rather, the image originating from the cathode ray tube (17) is received by the image conveying member (11), and is conveyed to the image receiving member (12), which displays the visual image to the observer. The image conveying member (11) and image receiving member (12) include the various structural elements discussed above, and function to provide an image free of harmful radiation, in the manner described above.

The cathode ray tube (17) is encased in a housing (73) which should entirely surround the cathode ray tube (17) on all sides, top and bottom, except for the spacing A-A'. The console also includes a lid (not shown) which may be secured to the uppermost surface of the housing. The spacing A—A' permits the conveyance of the image from the image conveying member (11) to the image receiving member (12). This space may be left open or, preferably, a clear plastic or glass window (55) bridges the space A—A'. Most preferably the window (55) is comprised of leaded glass which functions to eliminate any stray gamma or x-rays which might be reflected by the image conveying member (11), as well as any stray emissions from the cathode ray tube which might strike the window (55).

The housing (73) may be formed from thin lead, or from a laminate material such as a laminate comprised of thin lead and plastic. The housing may also be comprised of other dense aggregate materials which will absorb all radiation and especially x-ray and gamma ray radiation emitted by the cathode ray tube (17). For example, the housing may be comprised of concrete, leaded glass, or metals such as copper, aluminum or the like.

The barrier housing (73) which contains the cathode ray tube (17) should be adjusted in size and shape such that the full range of potential radiant emissions from the bombarded dots of phospherous emitting radiation in all directions as shown by dotted lines (56) will strike and be absorbed into the housing to a maximum degree. By adjusting the housing (73) to provide a barrier to the anticipated range of emissions from the cathode ray tube, the possibility of radiation passing out through the space A—A' is greatly reduced. Although it is unlikely that any x-ray or gamma rays emitted by the cathode ray tube (17) will be reflected by the image transmitting member (11), any x-ray or gamma radiation which is reflected or which in any other way moves toward the window will be traveling in a direction away from the observer, and will be absorbed at the window when a radiation absorptive window (55) is employed.

The image conveying member (11) is positioned within the housing so as to receive the visual image displayed by the cathode ray tube (17). The image conveying member (11) is secured by a bracket (57) to the inner wall of the housing. Alternatively, the image conveying member (11) may be secured within the housing (73) by means which permit the adjustment of the position of the member (11) relative to the cathode ray tube (17), and the image receiving member (12).

The image receiving member is mounted in a position convenient for observation by an observer seated as the keyboard (54) of the terminal. The member (12) is secured to the housing by means of a bracket (58). The bracket (58) is secured to the image receiving member (12) by means of a conventional ball and socket mount (41), which permits the full angular adjustment of the image receiving member (12) relative to the image conveying member (11). The bracket (58) may be mounted to the sidewall of the housing by means of a track (59) secured to the housing, and a cooperating projection (60) on the bracket (58) which permits the vertical height adjustment of the image receiving member (12) along the sidewall of the housing. Thus, an observer seated at the keyboard (54) may adjust the vertical height of the image receiving member (12) to a position convenient for viewing. The relative positions of the image receiving member (12) and the image conveying member (11), may also be adjusted so that the image conveyed by the image conveying member (11) is correctly located on the image receiving member (12).

FIG. 8 shows a cathode ray tube screen terminal which employs a miniaturized cathode ray tube (74). The cathode ray tube (74) conveys its visual image to the image conveying member (11), which in turn reflects the visual radiation which originated from the cathode ray tube (74) onto the image receiving member (12). The image conveying member (11) and the image receiving member (12) include the structural features described above, and function to provide a visual image which is viewed from the image receiving member (12) free of harmful radiation. However, the image receiving member (12) is concave in shape and, therefore, functions to provide an enlarged version of the image originally displayed by the cathode ray tube. Miniaturization of the cathode ray tube serves to reduce the amount of radiation initially created, reducing its threat of escape and its potential for biological damage.

The cathode ray tube (74) and the image conveying member (11) of FIG. 8 are encased in a housing (63) formed from a material capable of absorbing any stray radiation within the housing which strikes it. The housing (63) may be formed from any of the absorptive materials described above with reference to the housing (73) of FIG. 7. Since the housing (63) will absorb any gamma and x-ray radiation which penetrates the image conveying member (11), the absorptive backing layer (20) of the image conveying member (11) may be omitted.

The housing (63), and the position of the image conveying member (11), and cathode ray tube (74) within the housing are adjusted such that the full range of non-visible radiant emissions from the miniaturized cathode ray tube (74) (shown by dotted lines 64) is opposed by the housing, but will not pass through the space B—B' in the housing (63). Optionally, the space B—B' may be bridged by a window (62) which may be formed from transparent glass or plastic. Preferably the window (62) is comprised of leaded glass with cobalt, which functions to remove any x-ray or gamma ray radiation which might be inadvertently reflected by the image conveying member (11).

The image conveying member (11) may be secured to the inner wall of the housing (63) by an adjustable bracket (69), which includes a pivot member (75). The pivot member (75) permits the position of the member (11) to be adjusted relative to the cathode ray tube (74) and image receiving member (12). The image receiving member (12) is secured to the top wall (70) of the housing, and is positioned on the top housing wall (70), such that the visual image from the image conveying member (11) is reflected onto the image receiving member (12). The image receiving member (12) may be secured to the housing in a fixed position, or the image receiving member (12) may be mounted on the housing wall (70) by means which enable the viewer to adjust the angle of the image receiving member (12) relative to the top housing wall (70). For example, the image receiving member (12) may be mounted to top housing wall (70) by means of a ball member (71) formed on the image receiving member (12) which is engaged by a socket member (72) mounted on the housing (63). The socket member (72) may also be mounted on means which permit the adjustment of the distance between the observer and the image receiving member (12).

FIG. 9 shows the use of the image conveying member (11) and image receiving member (12) in association with a miniaturized cathode ray tube (74), and a conventional projector lens (64). The components are encased in a housing (66) which may be formed of any of the radiation absorptive materials discussed above with reference to the housing (73) of FIG. 7. The image conveyed from the image conveying member (11) to the image receiving member (12) is reflected through the image projector lens (64). The image conveying member (11) is secured to the housing by means of bracket member (70), and the image conveying member (11) is secured within the housing by means of bracket member (70). The bracket member (70) is secured to members (11) and (12) by means of a ball and socket joint (76), which allows the position of the member (11) relative to the member (12) to be adjusted. The visual image is conveyed through the projector lens (64) by the member (12) free of harmful radiation, and is enlarged by the projector lens (64), and displayed on a conventional rear projection screen (65). The use of a projector and screen will allow pre-setting during manufacture of the angles and distances among the reflective components so that a correctly-positioned, crisp image will be conveyed to the screen.

The projector lens (64) is mounted within the housing (66) by means of the baffle members (67), (68). The baffles (67), (68) define a circular orifice which is internally threaded, and threadably engages the threaded collar of the projector lens (64).

The embodiment of FIG. 9 may be employed in combination with a single miniaturized cathode ray tube having three electron guns conventionally employed in color television sets. Alternatively, three cathode ray tubes, one for each color may be employed in combination with one or three image conveying members, and one or three image receiving members.

FIG. 10 shows an embodiment of the invention wherein only the single image conveying member (11) is employed. The cathode ray tube (74) in this embodiment is a cathode ray tube which displays a mirror image which is corrected by conveyance onto the reflective surface of the image conveying member (11). The space C—C' of the housing (72) is bridged by a transparent window (78) which may be formed from leaded glass or plastic. The housing (72) may be formed from any of the radiation absorptive materials described above with reference to the housing (73) of FIG. 7.

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

We claim:

1. An apparatus which removes harmful radiation from the visible image producing radiation emitted by a cathode ray tube comprising:
   a. image conveying means for conveying by reflectance the visible image originating from a cathode ray tube, said image conveying means being comprised of a reflective layer and an absorptive layer, said reflective layer being substantially reflective of visible electromagnetic radiation and substantially transmissive of electromagnetic radiation of wavelengths shorter than visible radiation, and said absorptive layer being comprised of a material capable of absorbing the electromagnetic radiation transmitted by said reflective layer; and
   b. image receiving means for receiving the visible image conveyed by said image conveying means, said image receiving means being substantially reflective of visible electromagnetic radiation and substantially transmissive of electromagnetic radiation of wavelengths shorter than visible radiation; and c. wherein said image conveying means and image receiving means are mounted in a housing by means which permit the adjustment of the position of said image receiving means relative to said image conveying means.

2. The apparatus according to claim 1 wherein a. in said image conveying means said reflective layer is comprised of a material selected from the group consisting of silver, aluminum, glass and plastic; and said absorptive layer is comprised of a material selected from the group consisting of lead, copper, steel, leaded glass, leaded plastic and concrete; and wherein b. said image receiving means is comprised of a reflective material selected from the group consisting of silver, aluminum, glass and plastic.

3. The apparatus according to claim 2 wherein a. in said image conveying means, said absorptive layer is comprised of lead, and said reflective layer is comprised of silver; and wherein b. said image receiving means is comprised of silver.

4. The apparatus according to claim 1 wherein said apparatus further includes means for refracting the electromagnetic radiation conveyed by said apparatus such that non-visible radiation reflected by said image receiving means does not follow the path of visual radiation to the eyes of the viewer.

5. The apparatus according to claim 1 wherein a. said image conveying means further includes a refractive layer, said reflective layer being intermediate said absorptive layer and said refractive layer;

b. said refractive layer being comprised of a transparent material which refracts electromagnetic radiation.

6. The apparatus according to claims 1 or 5 wherein a. said image receiving means includes a backing layer, a refractive layer and a reflective layer, said reflective layer being positioned between said backing layer and said refractive layer;

b. said refractive layer being comprised of a material which refracts electromagnetic radiation.

7. The apparatus according to claim 5 wherein a. said refractive layer is comprised of glass, said absorptive layer is comprised of lead and said reflective layer is comprised of silver;

b. said refractive layer being adapted to refract the electromagnetic radiation conveyed from said image conveying means such that the path of visible radiation conveyed by said image conveying means is not parallel to the path of non-visible radiation conveyed by said image conveying means.

8. The apparatus according to claim 6 wherein a. said reflective layer is comprised of silver, and b. said refractive layer is comprised of glass, and wherein c. the path of the refracted visible radiation reflected to a viewer from said image receiving means is not parallel to the paths of non-visible radiation reflected from said image receiving means.

9. The apparatus according to claim 8 wherein said backing layer is comprised of a material selected from the group consisting of wood, glass, plastic or lead.

10. The apparatus according to claim 1 or claim 3 wherein:

a. said housing includes horizontally spaced apart parallel sidewalls having substantially vertical means;

b. said image conveying means and said image receiving means include pin means, wherein said pin means pass through said housing channel means and are engaged by pin engaging means;

c. said pin engaging means secure said image conveying means and said image receiving means in a fixed position between said sidewall channels, said pin engaging means are releasable, and when said pin engaging means are released said pin means are movable within said sidewall channels for adjustment of the vertical distance separating said image conveying means from said image receiving means; and, d. said image conveying means and said image receiving means are rotatable about said pin axis permitting adjustment of the angle of said image conveying means relative to said image receiving means.

11. The apparatus according to claim 1 wherein said apparatus further includes projector means for projecting the image reflected from said image receiving means onto a screen.

12. The apparatus according to claim 1 wherein said image receiving means has a concave reflective surface which enlarges the image conveyed by said image conveying means.

13. The apparatus according to claim 1 or claim 3 wherein said image conveying means and said image receiving means are mounted in said housing by mounting means having means for adjusting the angle of said image conveying means relative to said image receiving means.

14. The apparatus according to claim 1 or claim 3 wherein said housing includes parallel, horizontally spaced-apart sidewalls and wherein said image receiving means and said image conveying means are mounted between the parallel sidewalls of said housing by mounting means about which said image conveying means and image receiving means are rotatable for adjustment of the angle of said image conveying means relative to said image receiving means, said mounting means being movable along said housing sidewalls for adjustment of the vertical distance separating said image conveying means from said image receiving means in said housing.

15. The apparatus according to claim 13 wherein said housing includes means for mounting said housing on a cabinet which incorporates a cathode ray tube, such that said housing will oppose said cathode ray tube when it is mounted on said cabinet.

16. The apparatus according to claim 1 or claim 3 wherein said housing includes means for mounting said housing opposite to a cathode ray tube, wherein said mounting means includes means for adjusting the vertical alignment between said housing and said cathode ray tube, and means for adjusting the lateral distance between said housing and said cathode ray tube.

17. The apparatus according to claim 14 wherein said housing includes means for mounting said housing on a cabinet which incorporates a cathode ray tube such that said housing will oppose said cathode ray tube when it is mounted on said cabinet.

18. The apparatus according to claim 17 wherein said means for mounting said housing includes means for adjusting the lateral distance separating said housing from said cathode ray tube and means for adjusting the vertical alignment of said housing relative to said cathode ray tube.

19. An apparatus for housing a cathode ray tube and for conveying an image for visual observation from which harmful electromagnetic radiation has been removed comprising:
   a. image conveying means for conveying by reflectance the visible image originating from a cathode ray tube, said image conveying means being comprised of a material which is reflective of visible radiation and substantially transmissive of electromagnetic radiation of wavelengths shorter than visible radiation;
   b. image receiving means, for receiving the visible image conveyed by said image conveying means, said image receiving means being substantially reflective of visible radiation and substantially transmissive of radiation of wavelengths shorter than visible radiation;
   c. barrier means which encase said cathode ray tube and said image conveying means, said barrier means being adapted to absorb the electromagnetic radiation emitted by said cathode ray tube which is not reflected by said image conveying means;
   d. aperture means in said barrier means through which the visible radiation reflected by said image conveying means is conveyed to said image receiving means; and
   e. wherein said image receiving means is mounted external to said barrier means encasement by mounting means having means for adjusting the position of said image receiving means relative to said image transmitting means.

20. The apparatus according to claim 19 wherein said housing includes means for refracting the electromagnetic radiation reflected by said image conveying means and said image receiving means such that the paths of non-visible radiation reflected from said image receiving means do not follow the path of visible radiation conveyed to the eye of an observer.

21. The apparatus according to claim 20 wherein said image conveying means is comprised of a reflective material selected from the group consisting of silver, aluminum, glass and plastic, and said image receiving means is comprised of a reflective material selected from the group consisting of silver, aluminum, an aluminum alloy, glass or plastic.

22. The apparatus according to claim 20 wherein said image conveying means and said image receiving means are comprised of a refractive layer and a reflective layer, said refractive layer being comprised of glass and said reflective layer being comprised of silver.

23. The apparatus according to claim 20 wherein said housing aperture is covered by a transparent radiation absorptive material selected from the group consisting of glass, plastic, leaded glass or leaded plastic.

24. An apparatus which removes harmful radiation from the visible image producing radiation emitted by a cathode ray tube comprising:
   a. image conveying means for conveying by reflectance the visible image originating from a cathode ray tube, said image conveying means being comprised of a reflective layer and an absorptive layer, said reflective layer being substantially reflective of visible electromagnetic radiation and substantially transmissive of electromagnetic radiation of wavelengths shorter than visible radiation, and said absorptive layer being comprised of a material capable of absorbing the electromagnetic radiation transmitted by said reflective layer; and
   b. image receiving means for receiving the visible image conveyed by said image conveying means, said image receiving means being substantially reflective of visible electromagnetic radiation and substantially transmissive of electromagnetic radiation of wavelengths shorter than visible radiation; and
   c. wherein said conveying means and image receiving means are mounted in a housing, and wherein said housing has means for mounting said housing on a cabinet incorporating a cathode ray tube; and wherein said means for mounting said housing includes means for adjusting the vertical alignment of said housing relative to said cathode ray tube and means for adjusting the lateral distance separating said housing from said cathode ray tube.

25. The apparatus according to claim 24 wherein said means for mounting said housing includes support means secured to said housing, and means which engage said support means having means for securing said housing to said cabinet incorporating said cathode ray tube, and when said housing is mounted on said cabinet incorporating a cathode ray tube said housing is suspended from said support means opposite to said cathode ray tube, said support means having means for adjusting the vertical length of said support means, and said means for mounting said housing also having means for adjusting the lateral distance separating said housing from said cathode ray tube.

26. The apparatus according to claim 25 wherein
   a. said support means comprises an extensible member having means for securing said member at a fixed length and for releasing said extensible member so that its length can be extended or contracted, and
   b. said means engaging said extensible support member includes channel means, and said extensible member is secured at one end to said housing means and at its opposite end said extensible member is movably secured within said channel means by means which secure said extensible member in a fixed position within said channel means and said means are releasable to permit adjustment of the position of said extensible member within said channel means, said channel means being disposed relative to said housing such that adjustment of the position of said extensible member within said channel means adjusts the lateral distance separating said housing from said cathode ray tube when said mounting means is secured to said cabinet.

27. An apparatus which removes harmful radiation from the visible image producing radiation emitted by a cathode ray tube comprising:
   a. image conveying means for conveying by reflectance the visible image originating from a cathode ray tube, said image conveying means being comprised of a reflective layer and an absorptive layer, said reflective layer being substantially reflective of visible electromagnetic radiation and substantially transmissive of electromagnetic radiation of wavelengths shorter than visible radiation, and said absorptive layer being comprised of a material capable of absorbing the electromagnetic radiation transmitted by said reflective layer; and
   b. image receiving means for receiving the visible image conveyed by said image conveying means, said image receiving means being substantially reflective of visible electromagnetic radiation and substantially transmissive of electromagnetic radiation of wavelengths shorter than visible radiation; and c. wherein the reflective layer of said image conveying member is electrically grounded.

28. An apparatus which removes harmful radiation from the visible image producing radiation emitted by a cathode ray tube comprising:

a. image conveying means for conveying by reflectance the visible image originating from a cathode ray tube, said image conveying means being comprised of a reflective layer and an absorptive layer, said reflective layer being substantially reflective of visible electromagnetic radiation of wavelengths shorter than visible radiation, and said absorptive layer being comprised of a material capable of absorbing the electromagnetic radiation transmitted by said reflective layer; and b. image receiving means for receiving the visible image conveyed by said image conveying means, said image receiving means being substantially reflective of visible electromagnetic radiation and substantially transmissive of electromagnetic radiation of wavelengths shorter than visible radiation; and c. wherein the reflective layer of said image receiving means is electrically grounded.

29. An apparatus which removes harmful radiation from the visible image producing radiation emitted from a cathode ray tube comprising:

a. image conveying means for conveying by reflectance the visible image originating from a cathode ray tube, said image conveying means being comprised of a reflective layer being substantially reflective of visible electromagnetic radiation and substantially transmissive of electromagnetic radiation of wavelengths shorter than visible radiation, and said absorptive layer being comprised of a material capable of absorbing the electromagnetic radiation transmitted by said reflective layer; and b. image receiving means for receiving the visible image conveyed by said image conveying means, said image receiving means being substantially reflective of visible electromagnetic radiation and substantially transmissive of electromagnetic radiation of wavelengths shorter than visible radiation; and c. wherein said image conveying means and image receiving means being mounted in a housing and said housing opposes a cathode ray tube, said image conveying means and image receiving means being mounted in said housing by means which permit adjustment of the position of said image conveying means relative to said cathode ray tube, and the position of said image receiving means relative to said image conveying means.

30. The apparatus according to claim 29 wherein the relective layer of said image conveying means and image receiving means is comprised of silver, and said absorptive layer is comprised of lead.

31. The apparatus according to claim 30 wherein said cathode ray tube is in a cabinet and said housing is mounted on said cabinet by mounting means, said mounting means having means for adjusting the lateral distance separating said housing from said cathode ray tube, and means for adjusting the vertical alignment between said housing and said cathode ray tube.

32. The apparatus according to claim 30 wherein said apparatus further includes means for refracting the electromagnetic radiation conveyed by said apparatus such that non-visible radiation reflected by said image receiving means does not follow the path of visual radiation to the eyes of a viewer.

33. The apparatus according to claim 30 wherein the reflective layer of said image conveying means is electrically grounded.

34. The apparatus according to claim 30 wherein the reflective layer of said image receiving means is electrically grounded.

35. The apparatus according to claim 29 or claim 30 wherein said housing includes parallel sidewalls and wherein said image receiving means and said image conveying means are mounted between the parallel sidewalls of said housing by mounting means about which said image conveying means and image receiving means are rotatable for adjustment of the angle of said image conveying means relative to said image receiving means, said mounting means being movable along said housing sidewalls for adjustment of the distance separating said image conveying means from said image receiving means in said housing.

36. An apparatus which removes harmful radiation from the visible image producing radiation emitted by a cathode ray tube comprising:

a. a cathode ray tube; and b. image conveying means for conveying by reflectance the visible image originating from said cathode ray tube, said image conveying means being comprised of a reflective layer and an absorptive layer, said reflective layer being substantially reflective of visible electromagnetic radiation and substantially transmissive of electromagnetic radiation of wavelengths shorter than visible radiation, and said absorptive layer being comprised of a material capable of absorbing the electromagnetic radiation transmitted by said reflective layer; said absorptive layer of said image conveying means comprising a harmful radiation absorptive barrier opposite to said cathode ray tube, and c. image receiving means for receiving the visible image conveyed by said image conveying means, said image receiving means being substantially reflective of visible electromagnetic radiation and substantially transmissive of electromagnetic radiation of wavelengths shorter than visible radiation.

* * * * *